(12) United States Patent
Gallagher et al.

(10) Patent No.: US 9,574,574 B2
(45) Date of Patent: Feb. 21, 2017

(54) GAS TURBINE ENGINE AIRFOIL

(71) Applicant: United Technologies Corporation, Farmington, CT (US)

(72) Inventors: Edward J. Gallagher, West Hartford, CT (US); Byron R. Monzon, Cromwell, CT (US); Ling Liu, Glastonbury, CT (US); Linda S. Li, Middlefield, CT (US); Darryl Whitlow, Middletown, CT (US); Barry M. Ford, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/191,860

(22) Filed: Jun. 24, 2016

(65) Prior Publication Data
US 2016/0298643 A1    Oct. 13, 2016

Related U.S. Application Data

(63) Continuation of application No. 14/876,995, filed on Oct. 7, 2015, now Pat. No. 9,399,917, which is a
(Continued)

(51) Int. Cl.
*F01D 5/14* (2006.01)
*F04D 29/38* (2006.01)
*F04D 29/32* (2006.01)

(52) U.S. Cl.
CPC ........... *F04D 29/384* (2013.01); *F04D 29/325* (2013.01); *F05D 2220/32* (2013.01); *F05D 2240/303* (2013.01)

(58) Field of Classification Search
None
See application file for complete search history.

(56) References Cited

U.S. PATENT DOCUMENTS 2,934,259 A    4/1960    Hausmann
3,287,906 A    11/1966   McCormick
(Continued)

FOREIGN PATENT DOCUMENTS

EP    0801230    5/2009
EP    2226468    9/2010
(Continued)

OTHER PUBLICATIONS

Smith, L., Yeh,H.,(1963).Sweep and Dihedral Effects in Axial-Flow Turbomachinery;Journal of Basic Engineering; Sep. 1963.pp. 401-416.
(Continued)

*Primary Examiner* — Michael Lebentritt
(74) *Attorney, Agent, or Firm* — Carlson, Gaskey & Olds, P.C.

(57) ABSTRACT

An airfoil for a turbine engine includes an airfoil that has pressure and suction sides that extend in a radial direction from a 0% span position at an inner flow path location to a 100% span position at an airfoil tip. The airfoil has a relationship between a leading edge dihedral and a span position. The leading edge dihedral is negative from the 0% span position to the 100% span position. A positive dihedral corresponds to suction side-leaning, and a negative dihedral corresponds to pressure side-leaning. The airfoil has a relationship between a trailing edge dihedral and a span position. The trailing edge dihedral is positive from the 0% span position to the 100% span position. A positive dihedral corresponds to suction side-leaning and a negative dihedral corresponds to pressure side-leaning.

21 Claims, 5 Drawing Sheets

Related U.S. Application Data continuation of application No. 14/624,025, filed on Feb. 17, 2015, now Pat. No. 9,353,628.

(60) Provisional application No. 61/942,025, filed on Feb. 19, 2014.

(56) References Cited

U.S. PATENT DOCUMENTS

| | | |
|---|---|---|
| 3,747,343 A | 7/1973 | Rosen |
| 3,754,484 A | 8/1973 | Roberts |
| 3,892,358 A | 7/1975 | Gisslen |
| 4,012,172 A | 3/1977 | Schwaar et al. |
| 4,130,872 A | 12/1978 | Harloff |
| 4,431,376 A | 2/1984 | Lubenstein et al. |
| 4,682,935 A | 7/1987 | Martin |
| 4,826,400 A | 5/1989 | Gregory |
| 4,900,230 A | 2/1990 | Patel |
| 5,088,892 A | 2/1992 | Weingold |
| 5,141,400 A | 8/1992 | Murphy et al. |
| 5,167,489 A | 12/1992 | Wadia et al. |
| 5,277,549 A | 1/1994 | Chen et al. |
| 5,433,674 A | 7/1995 | Sheridan et al. |
| 5,443,367 A | 8/1995 | Samit et al. |
| 5,447,411 A | 9/1995 | Curley et al. |
| 5,524,847 A | 6/1996 | Brodell et al. |
| 5,525,038 A | 6/1996 | Sharma et al. |
| 5,624,234 A | 4/1997 | Neely et al. |
| 5,642,985 A | 7/1997 | Spear et al. |
| 5,725,354 A | 3/1998 | Wadia et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,059,532 A | 5/2000 | Chen et al. |
| 6,079,948 A | 6/2000 | Sasaki et al. |
| 6,223,616 B1 | 5/2001 | Sheridan |
| 6,299,412 B1 | 10/2001 | Wood et al. |
| 6,312,219 B1 | 11/2001 | Wood et al. |
| 6,318,070 B1 | 11/2001 | Rey et al. |
| 6,328,533 B1 | 12/2001 | Decker et al. |
| 6,331,100 B1 | 12/2001 | Liu et al. |
| 6,341,942 B1 | 1/2002 | Chou et al. |
| 6,814,541 B2 | 11/2004 | Evans et al. |
| 6,899,526 B2 | 5/2005 | Doloresco et al. |
| 6,994,524 B2 | 2/2006 | Owen et al. |
| 7,021,042 B2 | 4/2006 | Law |
| 7,204,676 B2 | 4/2007 | Dutton et al. |
| 7,374,403 B2 | 5/2008 | Decker et al. |
| 7,396,205 B2 | 7/2008 | Dube et al. |
| 7,476,086 B2 | 1/2009 | Wadia et al. |
| 7,497,664 B2 | 3/2009 | Walter et al. |
| 7,547,186 B2 | 6/2009 | Schuster et al. |
| 7,591,754 B2 | 9/2009 | Duong et al. |
| 7,785,075 B2 | 8/2010 | Botrel et al. |
| 7,806,653 B2 | 10/2010 | Burton et al. |
| 7,824,305 B2 | 11/2010 | Duong et al. |
| 7,926,260 B2 | 4/2011 | Sheridan et al. |
| 7,967,571 B2 | 6/2011 | Wood et al. |
| 7,997,872 B2 | 8/2011 | Wilson |
| 7,997,882 B2 | 8/2011 | Shulver |
| 8,087,885 B2 | 1/2012 | Suciu |
| 8,147,207 B2 | 4/2012 | Orosa et al. |
| 8,167,567 B2 | 5/2012 | Kirchner et al. |
| 8,205,432 B2 | 6/2012 | Sheridan |
| 8,246,292 B1 | 8/2012 | Morin et al. |
| RE43,710 E | 10/2012 | Spear et al. |
| 8,393,870 B2 | 3/2013 | Nash et al. |
| 8,464,426 B2 | 6/2013 | Kirchner et al. |
| 9,353,628 B2 * | 5/2016 | Gallagher .............. F01D 5/14 |
| 9,399,917 B2 * | 7/2016 | Gallagher .............. F01D 5/14 |
| 2003/0086788 A1 | 5/2003 | Chandraker |
| 2003/0163983 A1 | 9/2003 | Seda et al. |
| 2004/0091353 A1 | 5/2004 | Shahpar et al. |
| 2005/0031454 A1 | 2/2005 | Doloresco et al. |
| 2005/0169761 A1 | 8/2005 | Dube et al. |
| 2005/0254956 A1 | 11/2005 | Dutton et al. |
| 2006/0210395 A1 | 9/2006 | Schuster et al. |
| 2006/0228206 A1 | 10/2006 | Decker et al. |
| 2007/0041841 A1 | 2/2007 | Walter et al. |
| 2007/0160478 A1 | 7/2007 | Jarrah et al. |
| 2007/0201983 A1 | 8/2007 | Arinci et al. |
| 2007/0243068 A1 | 10/2007 | Wadia et al. |
| 2008/0101959 A1 | 5/2008 | McRae et al. |
| 2008/0120839 A1 | 5/2008 | Schilling |
| 2008/0148564 A1 | 6/2008 | Burton et al. |
| 2008/0226454 A1 | 9/2008 | Decker et al. |
| 2009/0226322 A1 | 9/2009 | Clemen |
| 2009/0274554 A1 | 11/2009 | Guemmer |
| 2009/0304518 A1 | 12/2009 | Kodama et al. |
| 2009/0317227 A1 | 12/2009 | Grover et al. |
| 2010/0054946 A1 | 3/2010 | Orosa et al. |
| 2010/0148396 A1 | 6/2010 | Xie et al. |
| 2010/0232970 A1 | 9/2010 | Murooka et al. |
| 2010/0254797 A1 | 10/2010 | Grover et al. |
| 2010/0260609 A1 | 10/2010 | Wood et al. |
| 2010/0331139 A1 | 12/2010 | McCune |
| 2011/0081252 A1 | 4/2011 | Li |
| 2011/0135482 A1 | 6/2011 | Nash et al. |
| 2011/0206527 A1 | 8/2011 | Harvey et al. |
| 2011/0225979 A1 | 9/2011 | Hoeger et al. |
| 2011/0268578 A1 | 11/2011 | Praisner et al. |
| 2011/0286850 A1 | 11/2011 | Micheli et al. |
| 2012/0057982 A1 | 3/2012 | O'Hearn et al. |
| 2012/0195767 A1 | 8/2012 | Gervais et al. |
| 2012/0237344 A1 | 9/2012 | Wood et al. |
| 2012/0243975 A1 | 9/2012 | Breeze-Stringfellow et al. |
| 2012/0244005 A1 | 9/2012 | Breeze-Stringfellow et al. |
| 2013/0008170 A1 | 1/2013 | Gallagher et al. |
| 2013/0022473 A1 | 1/2013 | Tran |
| 2013/0089415 A1 | 4/2013 | Brown et al. |
| 2013/0149108 A1 | 6/2013 | Webster |
| 2013/0164488 A1 | 6/2013 | Wood et al. |
| 2013/0189117 A1 | 7/2013 | Baltas et al. |
| 2013/0202403 A1 | 8/2013 | Morin et al. |
| 2013/0219922 A1 | 8/2013 | Gilson et al. |
| 2013/0224040 A1 | 8/2013 | Straccia |
| 2013/0266451 A1 | 10/2013 | Pesteil et al. |
| 2013/0340406 A1 | 12/2013 | Gallagher et al. |
| 2014/0030060 A1 | 1/2014 | Magowan |
| 2014/0248155 A1 | 9/2014 | Merville et al. |

FOREIGN PATENT DOCUMENTS

| | | |
|---|---|---|
| EP | 2535527 | 12/2012 |
| EP | 2543818 | 1/2013 |
| GB | 1516041 | 6/1978 |
| GB | 2041090 | 9/1980 |
| WO | 2007038674 | 4/2007 |

OTHER PUBLICATIONS

Engine Specifications. Engine Alliance GP7200—The Engine for the A380. Retrieved Feb. 19, 2015 from http://www.enginealliance.com/engine_specifications.html.

International Search Report and Written Opinion for PCT Application No. PCT/US2015/016018, mailed Nov. 24, 2015.

International Search Report and Written Opinion for PCT Application No. PCT/US2015016091, mailed Nov. 24, 2015.

International Search Report and Written Opinion for PCT Application No. PCT/US2015/016032, mailed Nov. 24, 2015.

International Search Report and Written Opinion for PCT Application No. PCT/US2015/016135, mailed Nov. 24, 2015.

International Search Report and Written Opinion for PCT Application No. PCT/US2015/016584, mailed Nov. 24, 2015.

International Search Report and Written Opinion for PCT Application No. PCT/US2015/015561, mailed Nov. 24, 2015.

International Search Report and Written Opinion for PCT Application No. PCT/US2015/015575, mailed Nov. 24, 2015.

International Search Report and Written Opinion for PCT Application No. PCT/US2015/015579, mailed Nov. 24, 2015.

International Search Report and Written Opinion for PCT Application No. PCT/US2015/015586, mailed Nov. 24, 2015.

(56) References Cited

OTHER PUBLICATIONS

Aerodynamic Design technique for Optimizing Fan Blade Spacing, Rogalsky et all., Proceedings of the 7th Annual Conference of the Computational Fluid Dynamics Society of Canada, 1999.

Turbine Design and Application. vol. 2. NASA, 1973.

Analytical Parametric Investigation of Low Pressure Ration Fan, NASA, 1973 Metzger et al.

Oyama et al., Multiobjective Optimization of a Multi-Stage Compressor Using Evolutionary Algorithm, NASA, 2002, AIAA 2002-3535 pp. 1-11.

McMillan, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

(56) References Cited

OTHER PUBLICATIONS

NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
The International Search Report and Written Opinion for PCT Application No. PCT/US2015/016187, mailed May 20, 2015.
The International Search Report and Written Opinion for PCT Application No. PCT/US2015/016011, mailed May 21, 2015.
The International Search Report and Written Opinion for PCT Application No. PCT/US2015/016078, mailed May 29, 2015.
The International Search Report and Written Opinion for PCT Application No. PCT/US2015/016154, mailed May 22, 2015.
The International Search Report and Written Opinion for PCT Application No. PCT/US2015/016086, mailed May 26, 2015.
The International Search Report and Written Opinion for PCT Application No. PCT/US2015/016554, mailed May 26, 2015.
The International Search Report and Written Opinion for PCT Application No. PCT/US2015/015554, mailed May 21, 2015.
The International Search Report and Written Opinion for PCT Application No. PCT/US2014/052325, mailed May 29, 2015.
The International Search Report and Written Opinion for PCT Application No. PCT/US2015/016378, mailed May 29, 2015.
The International Search Report and Written Opinion for PCT Application No. PCT/US2014/052293, mailed May 29, 2015.
The International Search Report and Written Opinion for PCT Application No. PCT/US2014/052516, mailed Jun. 10, 2015.
The International Search Report and Written Opinion for PCT Application No. PCT/US2015/016083, mailed Jul. 21, 2015.
International Preliminary Report on Patentability for PCT Application No. PCT/US2014/052282, mailed Sep. 1, 2016.
International Preliminary Report on Patentability for PCT Application No. PCT/US2015/016554, mailed Sep. 1, 2016.
International Preliminary Report on Patentability for PCT Application No. PCT/US2014/052434, mailed Sep. 1, 2016.
International Preliminary Report on Patentability for PCT Application No. PCT/US2014/052516, mailed Sep. 1, 2016.
International Preliminary Report on Patentability for PCT Application No. PCT/US2014/052447, mailed Sep. 1, 2016.
International Preliminary Report on Patentability for PCT Application No. PCT/US2015/015579, mailed Sep. 1, 2016.
International Preliminary Report on Patentability for PCT Application No. PCT/US2015/015586, mailed Sep. 1, 2016.
International Preliminary Report on Patentability for PCT Application No. PCT/US2014/052080, mailed Sep. 1, 2016.
International Preliminary Report on Patentability for PCT Application No. PCT/US2015/016135, mailed Sep. 1, 2016.
International Preliminary Report on Patentability for PCT Application No. PCT/US2015/016032 mailed Sep. 1, 2016.
International Preliminary Report on Patentability for PCT Application No. PCT/US2015/015561 mailed Sep. 1, 2016.

* cited by examiner

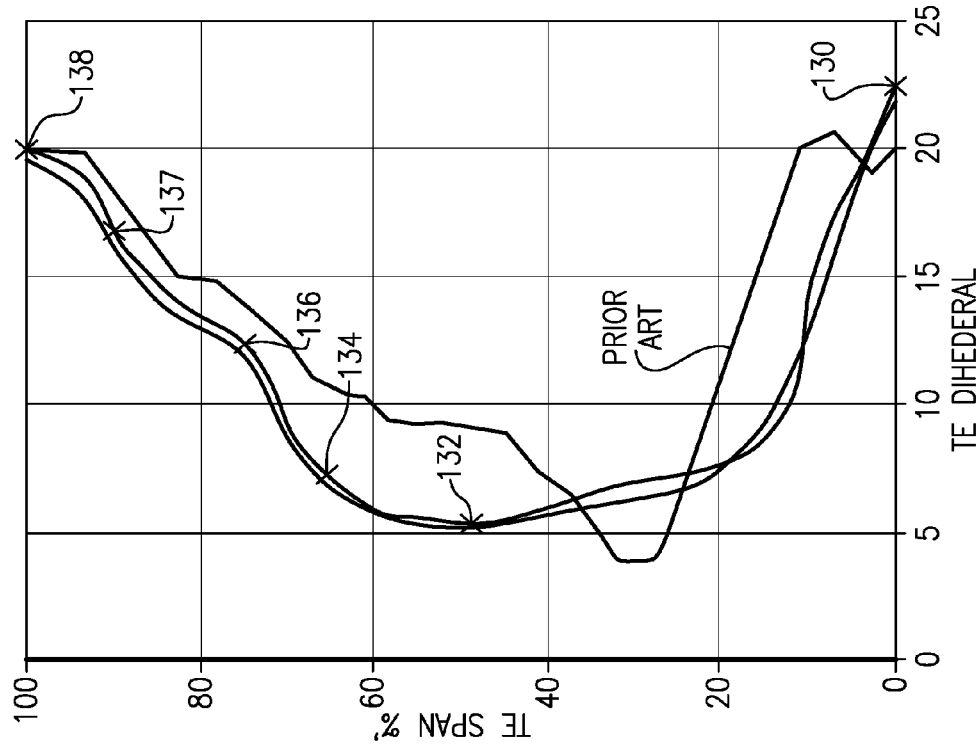
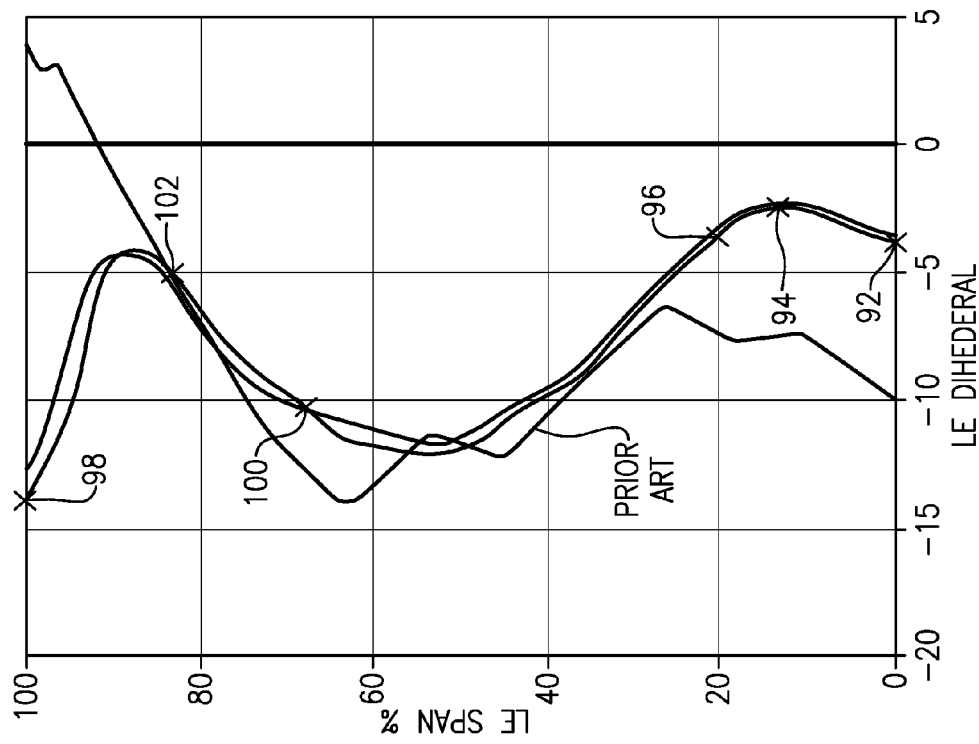
FIG.4A
FIG.4B

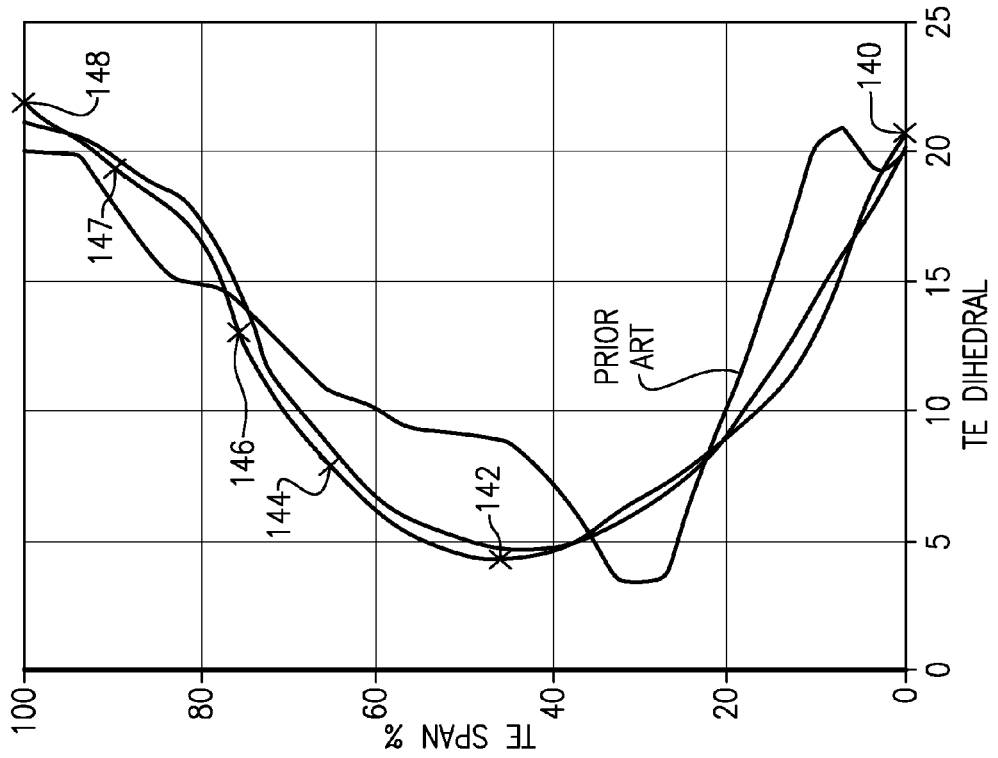
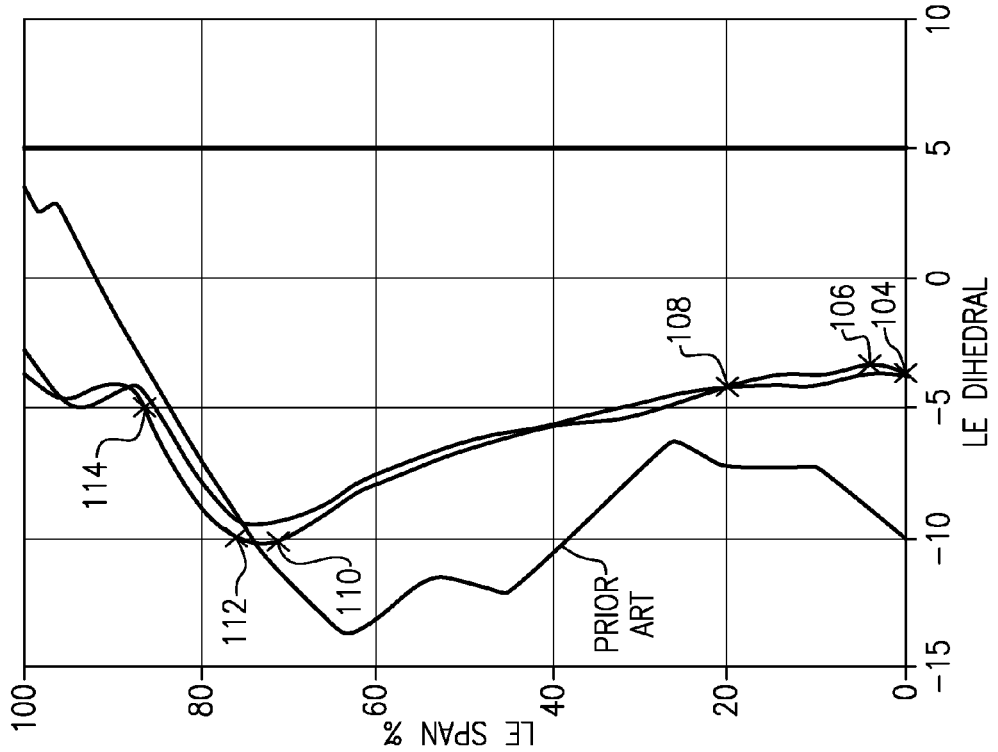

GAS TURBINE ENGINE AIRFOIL

CROSS-REFERENCE TO RELATED APPLICATION

This application is a continuation of U.S. application Ser. No. 14/876,995 filed on Oct. 7, 2015 which is a continuation of U.S. application Ser. No. 14/624,025 filed on Feb. 17, 2015 which is now U.S. Pat. No. 9,353,628 issued May 31, 2016, which claims priority to U.S. Provisional Application No. 61/942,025 filed on Feb. 19, 2014.

BACKGROUND

This disclosure relates generally to an airfoil for gas turbine engines, and more particularly to leading and trailing edge aerodynamic dihedral relative to span for gas turbine engine blades.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The propulsive efficiency of a gas turbine engine depends on many different factors, such as the design of the engine and the resulting performance debits on the fan that propels the engine. As an example, the fan may rotate at a high rate of speed such that air passes over the fan airfoils at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

In one exemplary embodiment, an airfoil for a turbine engine includes an airfoil that has pressure and suction sides that extend in a radial direction from a 0% span position at an inner flow path location to a 100% span position at an airfoil tip. The airfoil has a relationship between a leading edge dihedral and a span position. The leading edge dihedral is negative from the 0% span position to the 100% span position. A positive dihedral corresponds to suction side-leaning, and a negative dihedral corresponds to pressure side-leaning. The airfoil has a relationship between a trailing edge dihedral and a span position. The trailing edge dihedral is positive from the 0% span position to the 100% span position. A positive dihedral corresponds to suction side-leaning and a negative dihedral corresponds to pressure side-leaning.

In a further embodiment of the above airfoil, the leading edge dihedral at the 0% span position is in the range of −3° to −12°.

In a further embodiment of any of the above airfoils, the leading edge dihedral at the 0% span position is about −4°.

In a further embodiment of any of the above airfoils, the leading edge dihedral at the 0% span position is about −10°.

In a further embodiment of any of the above airfoils, the leading edge dihedral extends from the 0% span position to a 20% span position and has a leading edge dihedral in a range of −2° to −6°.

In a further embodiment of any of the above airfoils, the leading edge dihedral includes a first point at a 75% span position and extends generally linearly from the first point to a second point at the 85% span position.

In a further embodiment of any of the above airfoils, the first point is in a range of −8° to −10° dihedral.

In a further embodiment of any of the above airfoils, the second point is in a range of −3° to −6° dihedral.

In a further embodiment of any of the above airfoils, a maximum negative dihedral is in a range of 95-100% span position.

In a further embodiment of any of the above airfoils, a least negative dihedral is in a range of 5-15% span position.

In a further embodiment of any of the above airfoils, a maximum negative dihedral is in a range of 65-75% span position.

In a further embodiment of any of the above airfoils, a least negative dihedral is in a range of 0-10% span position.

In a further embodiment of any of the above airfoils, a maximum negative dihedral is in a range of 50-60% span position.

In a further embodiment of any of the above airfoils, the relationship provides a generally C-shaped curve from the 0% span position to a 50% span position and then a 90% span position.

In a further embodiment of any of the above airfoils, a trailing edge dihedral at the 0% span position is in a range of 20° to 25°.

In a further embodiment of any of the above airfoils, a trailing edge dihedral at about the 50% span position is in a range of 2° to 6°.

In a further embodiment of any of the above airfoils, a trailing edge dihedral at the 90% span position is in a range of 16° to 22°.

In a further embodiment of any of the above airfoils, from a 65% span position to a 75% span position the trailing edge dihedral increases about 5°.

In a further embodiment of any of the above airfoils, a positive-most trailing edge dihedral in a 80%-100% span position is within 5° of the trailing edge dihedral in the 0% span position.

In a further embodiment of any of the above airfoils, a least positive trailing edge dihedral is in a 40%-55% span position.

In a further embodiment of any of the above airfoils, the airfoil is a fan blade for a gas turbine engine.

BRIEF DESCRIPTION OF THE DRAWINGS

The disclosure can be further understood by reference to the following detailed description when considered in connection with the accompanying drawings wherein:

FIG. 4A illustrates a relationship between a leading edge aerodynamic dihedral angle and a span position for a set of first example airfoils and a prior art curve.

FIG. 4B illustrates a relationship between a trailing edge aerodynamic dihedral angle and a span position for a set of first example airfoils and a prior art curve.

FIG. 5A illustrates a relationship between a leading edge aerodynamic dihedral angle and a span position for a set of second example airfoils and a prior art curve.

FIG. 5B illustrates a relationship between a trailing edge aerodynamic dihedral angle and a span position for set of second example airfoils and a prior art curve.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
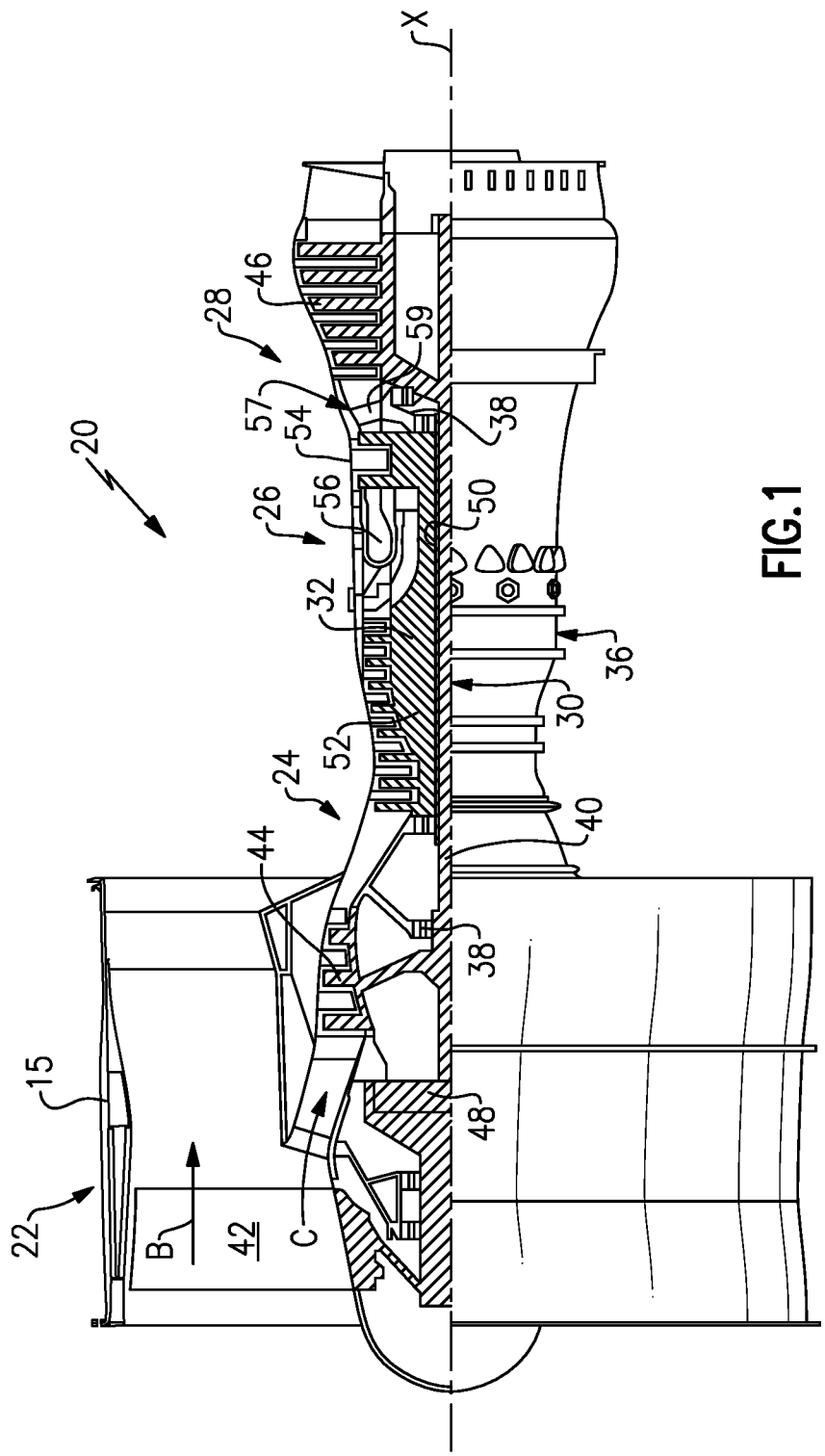
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(\text{Tram } ° \text{ R})/(518.7° \text{ R})]^{0.5}$. The "low corrected fan tip speed" as disclosed herein according to another non-limiting embodiment is less than about 1200 ft/second.

Figure 2A:
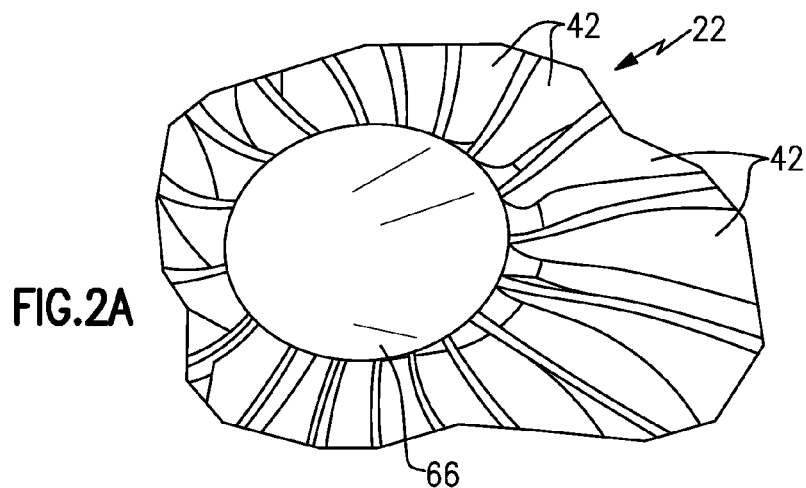
FIG. 2A is a perspective view of a portion of a fan section.
Figure 2B:
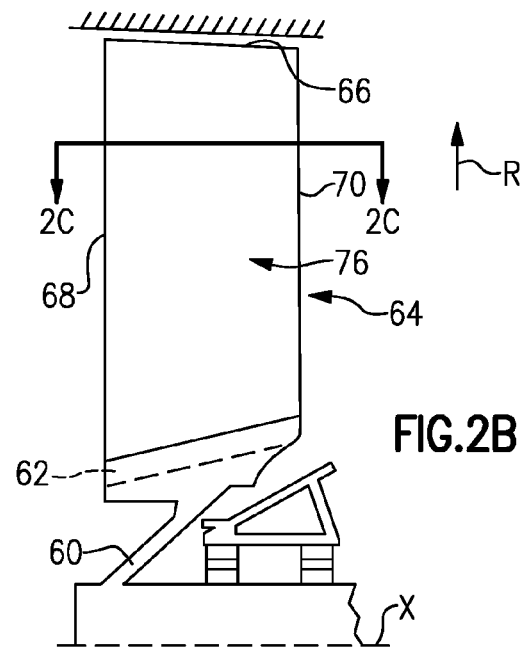
FIG. 2B is a schematic cross-sectional view of the fan section.
Figure 2C:
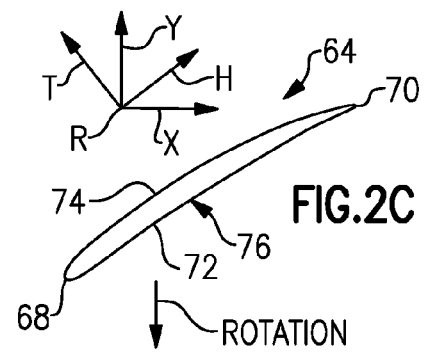
FIG. 2C is a cross-sectional view a fan blade taken along line 2C-2C in FIG. 2B.

Referring to FIG. 2A-2C, the fan blade 42 is supported by a fan hub 60 that is rotatable about the axis X, which corresponds to the X direction. Each fan blade 42 includes an airfoil 64 extending in a radial span direction R from a root 62 to a tip 66. A 0% span position corresponds to a section of the airfoil 64 at the inner flow path (e.g., a platform), and a 100% span position corresponds to a section of the airfoil 64 at the tip 66.

The root 62 is received in a correspondingly shaped slot in the fan hub 60. The airfoil 64 extends radially outward of the platform, which provides the inner flow path. The platform may be integral with the fan blade or separately secured to the fan hub, for example. A spinner 66 is supported relative to the fan hub 60 to provide an aerodynamic inner flow path into the fan section 22.

The airfoil 64 has an exterior surface 76 providing a contour that extends from a leading edge 68 aftward in a chord-wise direction H to a trailing edge 70, as shown in FIG. 2C. Pressure and suction sides 72, 74 join one another at the leading and trailing edges 68, 70 and are spaced apart from one another in an airfoil thickness direction T. An array of the fan blades 42 are positioned about the axis X in a circumferential or tangential direction Y. Any suitable number of fan blades may be used in a given application.

The exterior surface 76 of the airfoil 64 generates lift based upon its geometry and directs flow along the core flow path C. The fan blade 42 may be constructed from a composite material, or an aluminum alloy or titanium alloy, or a combination of one or more of these. Abrasion-resistant coatings or other protective coatings may be applied to the fan blade 42. The curves and associated values assume a fan in a hot, running condition (typically cruise).

Figure 3A:
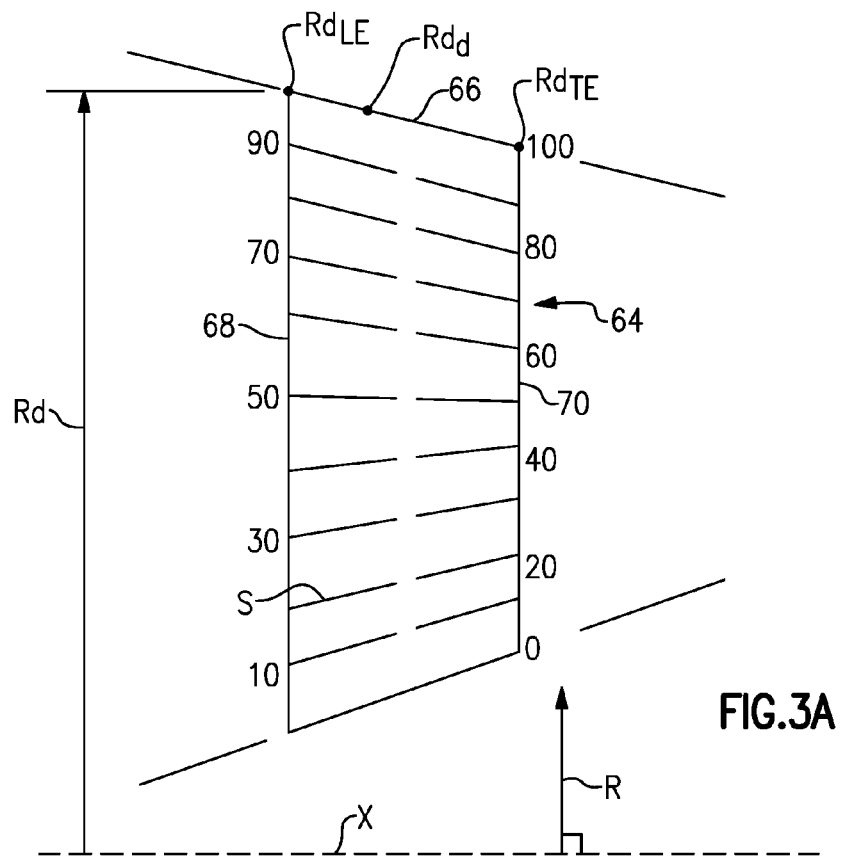
FIG. 3A is a schematic view of fan blade span positions.

One characteristic of fan blade performance relates to the fan blade's leading and trailing edge aerodynamic dihedral angle relative to a particular span position (R direction). Referring to FIG. 3A, span positions a schematically illustrated from 0% to 100% in 10% increments. Each section at a given span position is provided by a conical cut that corresponds to the shape of the core flow path, as shown by the large dashed lines. In the case of a fan blade with an integral platform, the 0% span position corresponds to the radially innermost location where the airfoil meets the fillet joining the airfoil to the platform. In the case of a fan blade without an integral platform, the 0% span position corresponds to the radially innermost location where the discrete platform meets the exterior surface of the airfoil. In addition to varying with span, leading and trailing edge sweep varies between a hot, running condition and a cold, static ("on the bench") condition.

Figure 3B:
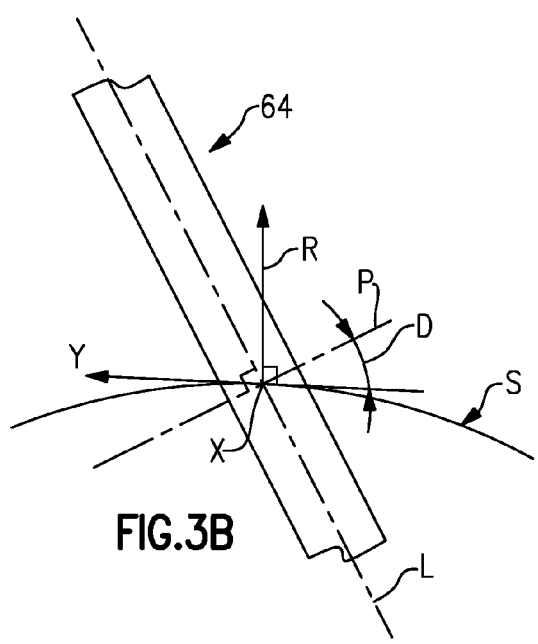
FIG. 3B is a schematic representation of a dihedral angle for an airfoil.

An aerodynamic dihedral angle D (simply referred to as "dihedral") is schematically illustrated in FIG. 3B for a simple airfoil. An axisymmetric stream surface S passes through the airfoil 64 at a location that corresponds to a span location (FIG. 3A). For the sake of simplicity, the dihedral D relates to the angle at which a line L along the leading or trailing edge tilts with respect to the stream surface S. A plane P is normal to the line L and forms an angle with the tangential direction Y, providing the dihedral D. A positive dihedral D corresponds to the line tilting toward the suction side (suction side-leaning), and a negative dihedral D corresponds to the line tilting toward the pressure side (pressure side-leaning). The method of determining and calculating the dihedral for more complex airfoil geometries is disclosed in Smith Jr., Leroy H., and Yeh, Hsuan "Sweep and Dihedral Effects in Axial-Flow Turbomachinery." *J. Basic Eng. Vol.* 85 Iss. 3, pp. 401-414 (Sep. 1, 1963), which is incorporated by reference in its entirety.

Example relationships between the leading edge dihedral (LE DIHEDRAL) and the span position (LE SPAN %) are shown in FIGS. 4A and 5A for several example fan blades, each represented by a curve. Only one curve in each graph is discussed for simplicity. In the examples, the leading edge dihedral is negative from the 0% span position to the 100% span position.

The leading edge dihedral at the 0% span position (92 in FIG. 4A; 104 in FIG. 5A) is in the range of −3° to −12°. In the examples shown in FIGS. 4A and 5A, the leading edge dihedral at the 0% span position is about −4°.

The leading edge dihedral extends from the 0% span position to a 20% span position (96 in FIG. 4A; 108 in FIG. 5A) having a leading edge dihedral in a range of −2° to −6°.

In the examples shown in FIGS. 4A and 5A, the leading edge dihedral includes a first point (100 in FIG. 4A; 110 in FIG. 5A) at a 75% span position and extends generally linearly from the first point to a second point (102 in FIG. 4A; 114 in FIG. 5A) at the 85% span position. The first point is in a range of −8° to −10° dihedral, and the second point is in a range of −3° to −6° dihedral.

Referring to FIG. 4A, a maximum negative dihedral 98 is in a range of 95-100% span position. A least negative dihedral 94 is in a range of 5-15% span position. Referring to FIG. 5A, a maximum negative dihedral 110 is in a range of 65-75% span position. A least negative dihedral 106 is in a range of 0-10% span position.

Example relationships between the trailing edge dihedral (TE DIHEDRAL) and the span position (TE SPAN %) are shown in FIGS. 4B and 5B for several example fan blades, each represented by a curve. Only one curve in each graph is discussed for simplicity. In the examples, the trailing edge dihedral is positive from the 0% span position to the 100% span position. The relationship provides a generally C-shaped curve from the 0% span position to a 50% span position and then a 90% span position.

A trailing edge dihedral (130 in FIG. 4B; 140 in FIG. 5B) at the 0% span position is in a range of 20° to 25°. A trailing edge dihedral (132 in FIG. 4B; 142 in FIG. 5B) at about the 50% span position is in a range of 2° to 6°. A trailing edge dihedral (137 in FIG. 4B; 147 in FIG. 5B) at the 90% span position is in a range of 16° to 22°. From a 65% span position (134 in FIG. 4B; 144 in FIG. 5B) to a 75% span position (136 in FIG. 4B; 146 in FIG. 5B) the trailing edge dihedral increases about 5°.

A positive-most trailing edge dihedral (138 in FIG. 4B; 148 in FIG. 5B) in a 80%-100% span position is within 5° of the trailing edge dihedral in the 0% span position (130 in FIG. 4B; 140 in FIG. 5B). A least positive trailing edge dihedral (132 in FIG. 4B; 142 in FIG. 5B) is in a 40%-55% span position.

The leading and trailing edge aerodynamic dihedral in a hot, running condition along the span of the airfoils 64 relate to the contour of the airfoil and provide necessary fan operation in cruise at the lower, preferential speeds enabled by the geared architecture 48 in order to enhance aerodynamic functionality and thermal efficiency. As used herein, the hot, running condition is the condition during cruise of the gas turbine engine 20. For example, the leading and trailing edge aerodynamic dihedral in the hot, running condition can be determined in a known manner using numerical analysis, such as finite element analysis.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a turbine engine comprising:
   an airfoil having pressure and suction sides extending in a radial direction from a 0% span position at an inner flow path location to a 100% span position at an airfoil tip, wherein the airfoil has a relationship between a leading edge dihedral and a span position, the leading edge dihedral negative from the 0% span position to the 100% span position, wherein a positive dihedral corresponds to suction side-leaning, and a negative dihedral corresponds to pressure side-leaning; and
   wherein the airfoil has a relationship between a trailing edge dihedral and a span position, the trailing edge dihedral positive from the 0% span position to the 100% span position, wherein a positive dihedral corresponds to suction side-leaning, and a negative dihedral corresponds to pressure side-leaning.

2. The airfoil according to claim 1, wherein the leading edge dihedral at the 0% span position is in the range of −3° to −12°.

3. The airfoil according to claim 2, wherein the leading edge dihedral at the 0% span position is about −4°.

4. The airfoil according to claim 2, wherein the leading edge dihedral at the 0% span position is about −10°.

5. The airfoil according to claim 2, wherein the leading edge dihedral extends from the 0% span position to a 20% span position having a leading edge dihedral in a range of −2° to −6°.

6. The airfoil according to claim 5, wherein the leading edge dihedral includes a first point at a 75% span position and extends generally linearly from the first point to a second point at the 85% span position.

7. The airfoil according to claim 6, wherein the first point is in a range of −8° to −10° dihedral.

8. The airfoil according to claim 6, wherein the second point is in a range of −3° to −6° dihedral.

9. The airfoil according to claim 2, wherein a maximum negative dihedral is in a range of 95-100% span position.

10. The airfoil according to claim 9, wherein a least negative dihedral is in a range of 5-15% span position.

11. The airfoil according to claim 2, wherein a maximum negative dihedral is in a range of 65-75% span position.

12. The airfoil according to claim 11, wherein a least negative dihedral is in a range of 0-10% span position.

13. The airfoil according to claim 2, wherein a maximum negative dihedral is in a range of 50-60% span position.

14. The airfoil according to claim 13, wherein the relationship provides a generally C-shaped curve from the 0% span position to a 50% span position and then a 90% span position.

15. The airfoil according to claim 14, wherein a trailing edge dihedral at the 0% span position is in a range of 20° to 25°.

16. The airfoil according to claim 15, wherein a trailing edge dihedral at about the 50% span position is in a range of 2° to 6°.

17. The airfoil according to claim 15, wherein a trailing edge dihedral at the 90% span position is in a range of 16° to 22°.

18. The airfoil according to claim 15, wherein from a 65% span position to a 75% span position the trailing edge dihedral increases about 5°.

19. The airfoil according to claim 16, wherein a positive-most trailing edge dihedral in a 80%-100% span position is within 5° of the trailing edge dihedral in the 0% span position.

20. The airfoil according to claim 15, wherein a least positive trailing edge dihedral is in a 40%-55% span position.

21. The airfoil according to claim 14, wherein the airfoil is a fan blade for a gas turbine engine.

* * * * *